US008688960B2

(12) United States Patent
Accapadi et al.

(10) Patent No.: US 8,688,960 B2
(45) Date of Patent: *Apr. 1, 2014

(54) MANAGING MIGRATION OF A PREFETCH STREAM FROM ONE PROCESSOR CORE TO ANOTHER PROCESSOR CORE

(75) Inventors: Matthew Accapadi, Austin, TX (US); Robert H. Bell, Jr., Austin, TX (US); Hong Lam Hua, Austin, TX (US); Ram Raghavan, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 830 days.

This patent is subject to a terminal disclaimer.

(21) Appl. No.: 12/905,176

(22) Filed: Oct. 15, 2010

(65) Prior Publication Data

US 2012/0096240 A1    Apr. 19, 2012

(51) Int. Cl.
*G06F 9/30*    (2006.01)

(52) U.S. Cl.
USPC .......................................... 712/207; 711/137

(58) Field of Classification Search
None
See application file for complete search history.

(56) References Cited

U.S. PATENT DOCUMENTS

| | | | |
|---|---|---|---|
| 7,366,879 B2 | 4/2008 | Rodgers et al. | |
| 7,383,393 B2 * | 6/2008 | Al Sukhni et al. | ............ 711/137 |
| 7,421,567 B2 | 9/2008 | Eickemeyer et al. | |
| 7,444,498 B2 | 10/2008 | Eickemeyer et al. | |
| 7,594,096 B2 | 9/2009 | Eickemeyer et al. | |
| 7,620,799 B2 | 11/2009 | Eickemeyer et al. | |
| 2010/0241811 A1 * | 9/2010 | Solihin | ......................... 711/137 |

OTHER PUBLICATIONS

Lu, J. et al., Dynamic Helper Threaded Prefetching on the Sun UltraSPARC CMP Processor, 2005 (IEEE).
Bhargava, R. et al., Accelerating Two-Dimensional Page Walks for Virtualized Systems, 2008.
Cain, HW. et al., Runahead Execution vs. Conventional Data Prefetching in the IBM POWER6 Microprocessor, 2009.
Annavaram, M. et al., Data Prefetching by Dependence Graph Precomputation, 2000-2001.
Chaudhry, S. et al., Rock: A SPARC CMIT Processor, 2008.

* cited by examiner

*Primary Examiner* — Andrew Caldwell
*Assistant Examiner* — Benjamin Geib
(74) *Attorney, Agent, or Firm* — Terrile, Cannatti, Chambers & Holland, LLP; Stephen A. Terrile

(57) ABSTRACT

A method, system and computer-usable medium are disclosed for managing prefetch streams in a virtual machine environment. Compiled application code in a first core, which comprises a Special Purpose Register (SPR) and a plurality of first prefetch engines, initiates a prefetch stream request. If the prefetch stream request cannot be initiated due to unavailability of a first prefetch engine, then an indicator bit indicating a Prefetch Stream Dispatch Fault is set in the SPR, causing a Hypervisor to interrupt the execution of the prefetch stream request. The Hypervisor then calls its associated operating system (OS), which determines prefetch engine availability for a second core comprising a plurality of second prefetch engines. If a second prefetch engine is available, then the OS migrates the prefetch stream request from the first core to the second core, where it is initiated on an available second prefetch engine.

14 Claims, 3 Drawing Sheets

MANAGING MIGRATION OF A PREFETCH STREAM FROM ONE PROCESSOR CORE TO ANOTHER PROCESSOR CORE

BACKGROUND OF THE INVENTION

1. Field of the Invention

The present invention relates in general to the field of computers and similar technologies, and in particular to software utilized in this field. Still more particularly, it relates to a method, system, and computer usable medium for managing prefetch streams in a virtual machine environment.

2. Description of the Related Art

Prefetching is a known approach in conventional computing systems for lessening the effects of memory access latency, which can adversely affect the performance of applications on modern processors. Rather than waiting for a cache miss to initiate a memory fetch, data prefetching anticipates such misses and issues a fetch to the memory system in advance of the actual memory reference. Data prefetching can be accomplished by software alone, hardware alone or a combination of the two. Software prefetching relies on compile-time analysis to insert and schedule prefetch, or touch, instructions within user programs. But prefetch instructions themselves involve some overhead. Hardware-based prefetching employs special hardware which monitors the storage reference patterns of the application in an attempt to infer prefetching opportunities. It has no instruction overhead, but it is often less accurate than software prefetching because it speculates on future memory accesses without the benefit of compile-time information. The combination of software and hardware prefetching is designed to take advantage of compile-time program information so as to direct the hardware prefetcher while incurring the least amount of software overhead as possible.

Stream prefetching provides an efficient use of resources in processors and processing systems. When sequential access to two or more adjacent locations is detected, one or more additional cache lines can be prefetched from lower levels of a memory hierarchy in order to attempt to have data and/or instructions ready for use by the processor as they are needed. A "stream" is a contiguous set of cache lines containing instructions or data, or in some specialized processor architectures, instructions and data.

It is not uncommon for hardware data prefetching to be disabled in some software applications and have the application itself initiate prefetch streams. However, if the steam cannot be established in the hardware due to a lack of available prefetch machines, or due to initiated prefetches being terminated, or slow execution due to too many instructions in the core, the software application may have already moved on to other instructions. Currently, there is no known method to re-instantiate the stream to prefetch data as expected by the application. In view of the foregoing, there is a need for a method in a virtual machine environment for the Hypervisor and operating system kernel to re-instantiate the stream such that the data can be prefetched as expected by the application.

SUMMARY OF THE INVENTION

A method, system and computer-usable medium are disclosed for managing prefetch streams in a virtual machine environment. In various embodiments, compiled application code in a first core, which comprises a Special Purpose Register (SPR) and a plurality of first prefetch engines, signals a cache prefetch engine controller to initiate a prefetch stream request. If the prefetch stream request cannot be initiated because no prefetch engines are available to process the request, then an indicator bit indicating a Prefetch Stream Dispatch Fault is set in the SPR.

The fault condition, and the subsequent setting of the fault indicator bit in the SPR, causes a Hypervisor to interrupt the thread execution of the prefetch stream request. The Hypervisor then calls its associated operating system (OS), which determines prefetch engine availability indicators for a second core, which comprises a plurality of second prefetch engines. If a second prefetch engine is available, then the OS migrates the thread causing the prefetch stream dispatch fault from the first core to the second core. The second core then signals its corresponding cache prefetch engine controller to initiate the prefetch stream request, using the available second prefetch engine. Once the prefetch stream is initiated, requested stream cache lines are prefetched from system memory and stored in a cache. Future accesses of the stream addresses proceed from the cache associated with the second core.

In various embodiments, each core tracks the number of available prefetch machines in a register. The operating system kernel likewise polls the registers in the cores in the local node or chip and picks a core with available prefetch machines. In these and other embodiments, preference is given to the least utilized core that has available prefetch machines when choosing among cores with the least number of available machines.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
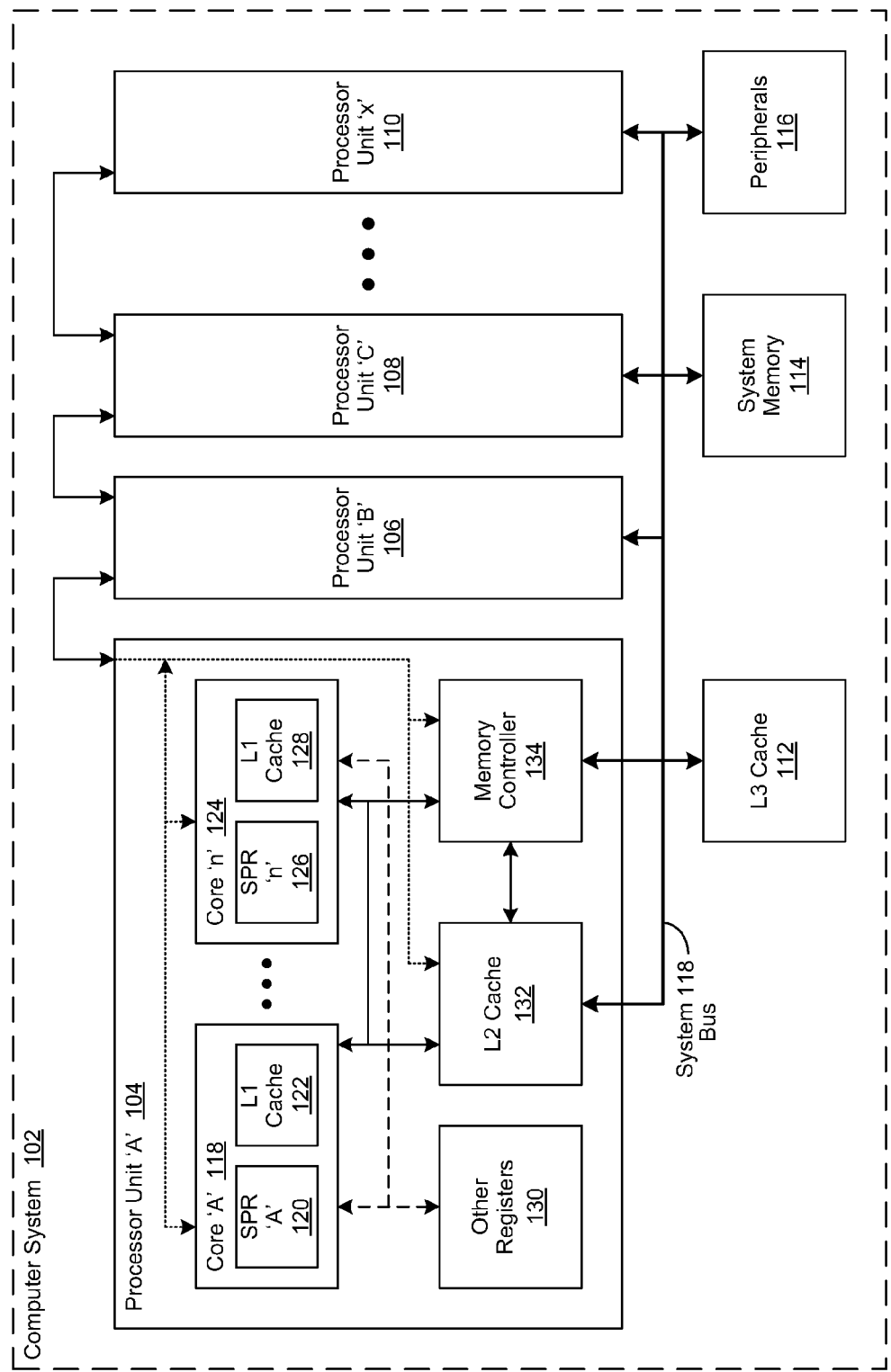
FIG. 1 depicts an exemplary computer system in which the present invention may be implemented.

A method, system and computer-usable medium are disclosed for managing prefetch streams in a virtual machine environment. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary symmetric multi-processor computer system 102 in which the present invention may be utilized. In various embodiments, computer system 102 includes processor units 'A' 104, 'B' 106, and 'C' 108 through 'x' 110 that are coupled to a system bus 118. A Level 3 (L3) cache 112, system memory 114, and peripherals 116 are likewise coupled to system bus 118. In these and other embodiments, processor units 'A' 104, 'B' 106, and 'C' 108 through 'x' 110 communicate with each other, the Level 3 (L3) cache 112, the system memory 114, and peripherals 116 via system bus 118.

The system memory 114, comprising random access memory (RAM) stores program instructions and operand data used by the processor units 'A' 104, 'B' 106, and 'C' 108 through 'x' 110, in a volatile, or temporary, state. The peripherals 116 may be connected to the system bus 118 via a bus, such as a peripheral component interconnect (PCI) local bus, using a PCI host bridge. A PCI bridge provides a low latency path through which processor units 'A' 104, 'B' 106, and 'C' 108 through 'x' 110 may access PCI devices mapped anywhere within bus memory or input/output (I/O) address spaces. The PCI host bridge interconnecting the peripherals 116 also provides a high bandwidth path to allow the PCI devices to access the system memory 114. Such PCI devices may include a network adapter, a small computer system interface (SCSI) adapter providing interconnection to a permanent storage device (e.g., a hard disk), and an expansion bus bridge such as an industry standard architecture (ISA) expansion bus for connection to I/O devices including a keyboard, a graphics adapter connected to a display device, and a graphical pointing device (mouse) for use with the display device.

In a symmetric multi-processor (SMP) computer, the processor units 'A' 104, 'B' 106, and 'C' 108 through 'x' 110 are generally identical. That is, they all use a common set or subset of instructions and protocols to operate, and generally have the same architecture. As shown with processor unit 'A' 104, each processor unit may include one or more processor cores 'A' 118 through 'n' 124, which carry out program instructions in order to operate the computer. An exemplary processor unit includes the POWER5™ processor marketed by International Business Machines Corp., which comprises a single integrated circuit superscalar microprocessor having various execution units, registers, buffers, memories, and other functional units, which are all formed by integrated circuitry. The processor cores A' 118 through 'n' 124 may operate according to reduced instruction set computing (RISC) techniques, and may employ both pipelining and out-of-order execution of instructions to further improve the performance of the superscalar architecture.

Each processor core 'A' 118 through 'n' 124 respectively includes an on-board, Level 1 (L1) cache 122 through 128, which typically comprise separate instruction and data caches implemented using high speed memory devices. Caches are commonly used to temporarily store values that might be repeatedly accessed by a processor in order to speed up processing by avoiding the longer step of loading the values from the system memory 114. A processor units 'A' 104, 'B' 106, and 'C' 108 through 'x' 110 can include another cache such as a second level (L2) cache 132, which along with a memory controller 134, supports both of the L1 caches 122 through 128 that are respectively part of cores 'A' 118 through 'n' 124. Additional cache levels may be provided, such as the L3 cache 112, which is accessible via the system bus 118. Each cache level, from highest (L1) to lowest (L3) can successively store more information, but at a longer access penalty. For example, the on-board L1 caches 122 through 128 in the processor cores 'A' 118 through 'n' 124 might have a storage capacity of 128 kilobytes of memory, the L2 cache 132 might have a storage capacity of 4 megabytes, and the L3 cache 112 might have a storage capacity of 32 megabytes. To facilitate repair or replacement of defective processor unit components, each processing unit units 'A' 104, 'B' 106, and 'C' 108 through 'x' 110 may be constructed in the form of a replaceable circuit board, pluggable module, or similar field replaceable unit (FRU), which can be easily swapped, installed in, or swapped out of the computer system 102 in a modular fashion.

A cache has many memory blocks which individually store the various instructions and data values. The blocks in any cache are divided into groups of blocks called sets or congruence classes. A set is the collection of cache blocks that a given memory block can reside in. For any given memory block, there is a unique set in the cache that the block can be mapped into, according to preset mapping functions. The number of blocks in a set is referred to as the associativity of the cache. For example, a 2-way set associative means that for any given memory block there are two blocks in the cache that the memory block can be mapped into. However, several different blocks in main memory can be mapped to any given set. A 1-way set associate cache is direct mapped. That is, there is only one cache block that can contain a particular memory block. A cache is said to be fully associative if a memory block can occupy any cache block, i.e., there is one congruence class, and the address tag is the full address of the memory block.

An exemplary cache line (block) includes an address field, a state bit field, an inclusivity bit field, and a value field for storing the actual program instruction or operand data. The state bit field and inclusivity bit fields are used to maintain cache coherency in a multiprocessor computer system to indicate the validity of the value stored in the cache. The address field is a subset of the full address of the corresponding memory block. A compare match of an incoming address with one of the address fields (when the state field bits designate this line as currently valid in the cache) indicates a cache "hit." The collection of all of the address fields in a cache (and sometimes the state bit and inclusivity bit fields) is referred to as a directory, and the collection of all of the value fields is the cache entry array.

When all of the blocks in a congruence class for a given cache are full and that cache receives a request, whether a read or write operation to a memory location that maps into the full congruence class, the cache must "evict" one of the blocks currently in that class. The cache chooses a block by one of a number of means known to those skilled in the art, such as least recently used (LRU), random, pseudo-LRU, etc. to be evicted or cast out. If the data in the chosen block is modified, that data is written to the next lowest level in the memory hierarchy which may be another cache (in the case of the L2 or on-board cache) or main memory (in the case of an L3 cache, as depicted in the three-level architecture of FIG. 1). If the data in the chosen block is not modified, the block can optionally be abandoned and not written to the next lowest level in the memory hierarchy, i.e., if the next lower level is the system memory 114, the non-modified line is abandoned. If the next level in the hierarchy is another cache, the shared copy can be moved. At the end of this process, the cache no longer holds a copy of the evicted block.

The control logic for a cache memory, and in particular a cache directory, may include error correction code (ECC) circuits to handle errors that arise in a cache line. A bit in a given cache block may contain an incorrect value either due to a soft error, such as stray radiation or electrostatic discharge, or to a hard error (e.g., a defective cell). ECCs can be used to reconstruct the proper data stream. Some ECCs can only be used to detect double-bit errors and correct single-bit errors, i.e., if two bits in a particular block are invalid, then the ECC will not be able to determine what the proper data stream should actually be, but at least the failure can be detected. Other ECCs are more sophisticated and even allow detection of triple-bit errors and correction of double errors. These latter errors are costly to correct, but the design tradeoff is to halt the machine when double-bit (uncorrectable) errors occur.

These ECC circuits are one way to deal with soft errors arising in memory cells. Another approach used for dealing with hard errors is to provide redundancy within the arrays (directory, LRU, cache). When a cache chip is fabricated, it can be tested to determine if there are any defective row or column lines in each of the arrays (row and column lines are tested for the entire cache, directory, and LRU). If an array is defective, a fuse can be permanently blown to indicate its defective nature. A comparison is then made inside the array for each accessed address to see if it matches with a defective address. If so, appropriate logic re-routes the address to one of many extra row and column lines formed on the chip, i.e., from redundant bit lines (columns) and word lines (rows). The number of extra bit and word lines may vary depending upon the defect rate and desired chip yield. For a low-defect (larger physical size) cache, two extra lines might be provided for every 256 regular lines, while in a high-defect (smaller physical size) cache, two extra lines might be provided for every eight regular lines.

In various embodiments, core 'A' 118 through core 'n' 124 respectively comprise a Special Purpose Register (SPR) 'A' 120 through 'n' 126. In these and other embodiments, a bit indicating a Prefetch Stream Dispatch Fault is respectively set in SPR 'A' 120 through 'n' 126 set to indicate that insufficient prefetch engines are available in core 'A' 118 through core 'n' 124 to perform a prefetch address stream request. Setting the indicator Prefetch Stream Dispatch Fault bit in SPR 'A' 120 through 'n' 126 results in an operating system associated with the computer system 102 determining the availability of other prefetch engines in core 'A' 118 through core 'n' 124. If additional prefetch engines are available, then the prefetch address stream request is migrated to a core with an available prefetch engine.

The hardware elements depicted in client computer 102 are not intended to be exhaustive, but rather are representative to highlight components used by the present invention. These and other variations are intended to be within the spirit and scope of the present invention.

Figure 2:
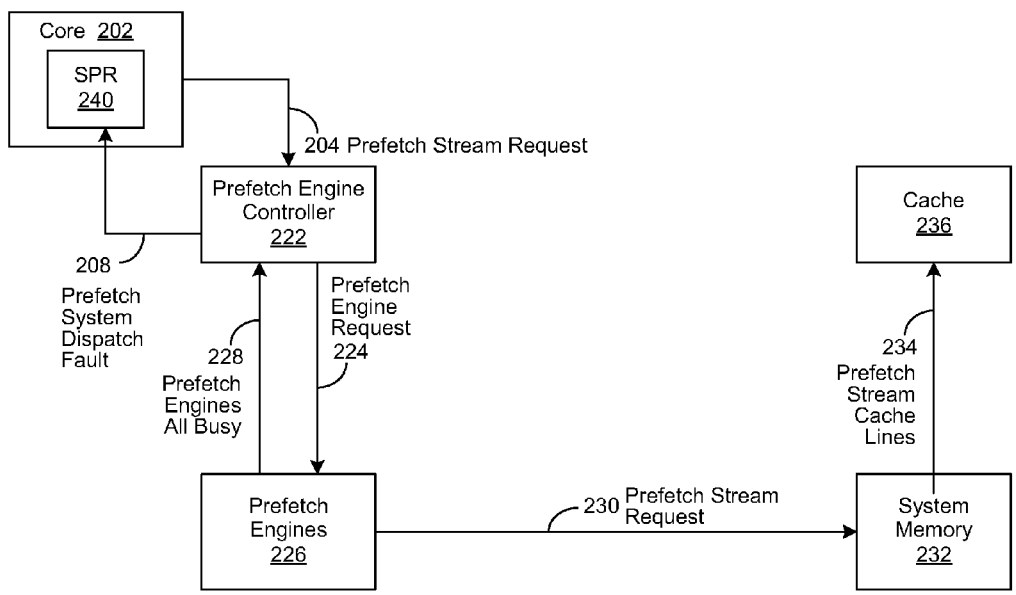
FIG. 2 is a simplified block diagram of the operation of a of a Special Purpose Register (SPR) as implemented with a prefetch engine controller.

FIG. 2 is a simplified block diagram of the operation of a Special Purpose Register (SPR) as implemented with a prefetch engine controller in accordance with an embodiment of the invention. In this embodiment, compiled application code in a core 202, which comprises a Special Purpose Register (SPR) 240, signals the cache prefetch engine controller 222 to initiate an instruction prefetch stream request 204, starting with a particular address and stride. The prefetch controller 222 attempts to initiate 224 the stream in one of a plurality of prefetch engines 226, which reside in core 202. As an example, current core designs typically comprise 8 to 16 prefetch engines. If a prefetch engine is available, then the prefetch controller 222 initiates 230 the prefetch stream request to begin requesting data or instructions from system memory 232. Thereafter, requested stream cache lines are prefetched 234 from the system memory 232 and stored in cache 236. However, if the prefetch engines 226 are all busy 228, and no prefetch engines are available, then an indicator is asserted, which tells the prefetch controller 222 that the prefetch cannot be initiated.

As a result, a bit indicating a Prefetch Stream Dispatch Fault 208 is set in the SPR 240 and the stream request 224 from the core 202 is either ignored or some other stream is broken and replaced by the stream request. The consequence is that no lines for a stream are prefetched in the cache 236 for future use. Future requests in the address stream, i.e., addresses with a particular stride from the starting address, will not be found in the cache 236, thereby reducing performance for a known stream of data or instructions.

Figure 3:
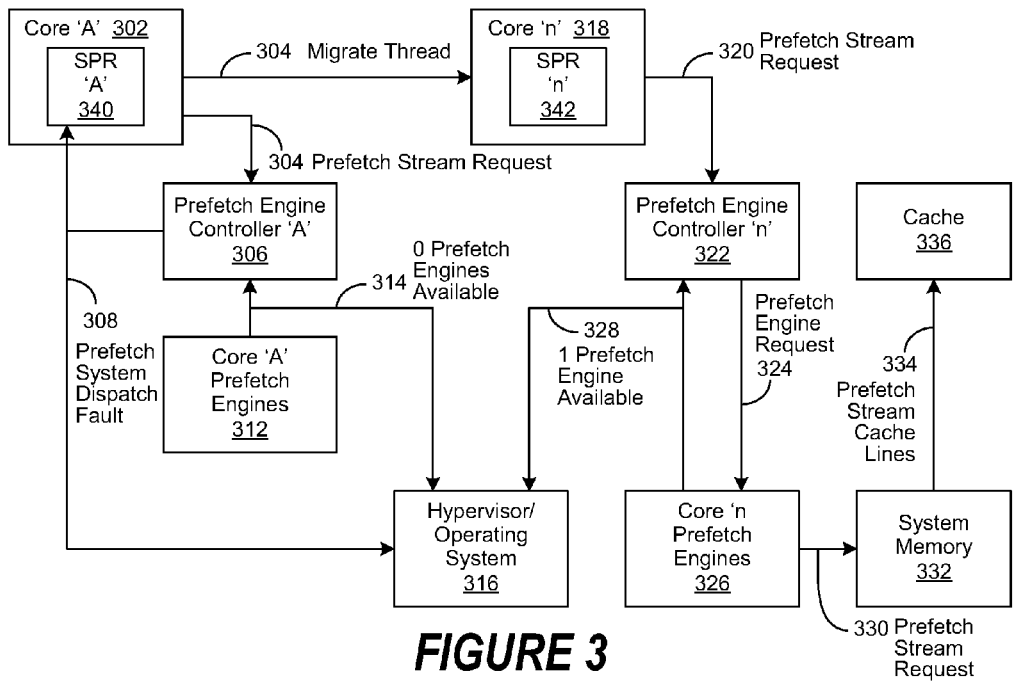
FIG. 3 is a simplified block diagram of the operation of a Special Purpose Register (SPR) for managing prefetch streams in a virtual machine environment.

FIG. 3 is a simplified block diagram of the operation of a Special Purpose Register (SPR) as implemented in accordance with an embodiment of the invention for managing prefetch streams in a virtual machine environment. In this embodiment, compiled application code in a core 'A' 302, which comprises a Special Purpose Register (SPR) 'A' 340, signals the cache prefetch engine controller 'A' 306 to initiate an instruction prefetch stream request 304, starting with a particular address and stride. If the prefetch address stream request 304 cannot be initiated because there are insufficient core 'A' prefetch engines 312, an indicator bit indicating a Prefetch Stream Dispatch Fault 308 is set in the SPR 340. Since the fault condition applies to the prefetch stream instruction, all subsequent instructions do not complete and are flushed through precise interrupts. The fault condition, and the subsequent setting of the fault indicator bit in the SPR 340, causes the Hypervisor 316 to interrupt the thread execution of the prefetch address stream request. The Hypervisor 316 then calls its associated operating system (OS), which examines 314, 328 all prefetch engine availability indicators for cores 'A' 302 through 'n' 318, which likewise comprises SPR 'n' 342.

Upon finding 328 an available prefetch engine in core 'n' 318, the OS migrates 304 the thread causing the fault from core 'A' 302 to core 'n' 318 using its normal migration capability. Core 'n' 318 then signals the cache prefetch engine controller 'n' 322 to initiate an instruction prefetch stream request 324, using the available core 'n' prefetch engine 326. The prefetch controller 322 then initiates 330 the prefetch stream request to begin requesting data or instructions from system memory 332. Thereafter, requested stream cache lines are prefetched 334 from the system memory 332 and stored in cache 336. Future accesses of the stream addresses proceed from the cache associated with core 'n' 318, with improved performance compared to misses if the stream remained in core 'A' 302.

In various embodiments, each core tracks the number of available prefetch machines in a register. The operating system kernel likewise polls the registers in the cores in the local node or chip and picks a core with available prefetch machines. In these and other embodiments, preference is given to the least utilized core 'A' 302 through core 'n' 318 that has available prefetch machines when choosing among cores with the least number of available machines.

Figure 4:
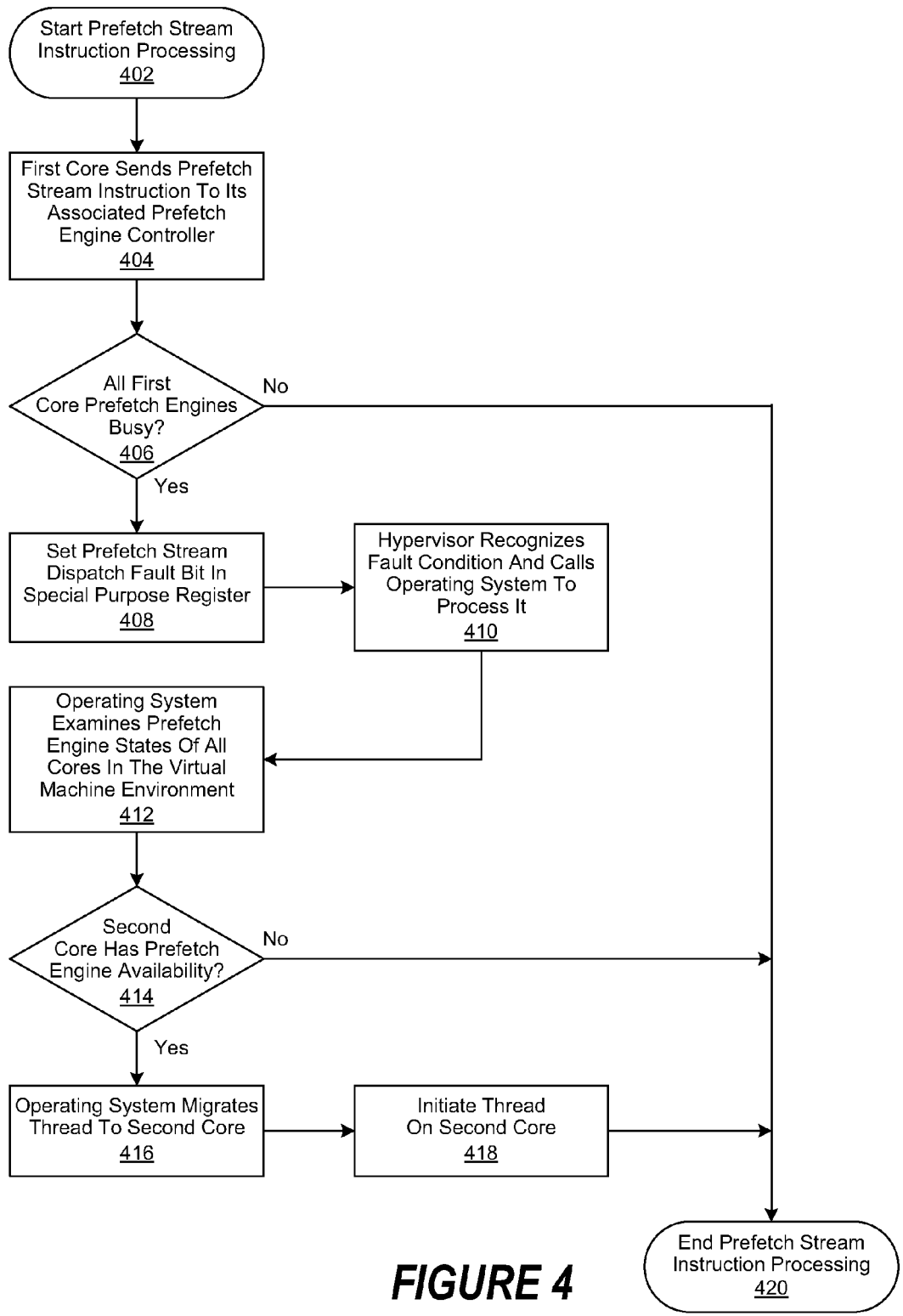
FIG. 4 is a generalized flowchart of the operation of a Special Purpose Register (SPR) for managing prefetch streams in a virtual machine environment.

FIG. 4 is a generalized flowchart of the operation of a Special Purpose Register (SPR) as implemented in accordance with an embodiment of the invention for managing prefetch streams in a virtual machine environment. In this embodiment, prefetch stream instruction processing is begun in step 402, followed by a first core sending prefetch stream instructions to its associated prefetch engine controller in step 406. A determination is then made in step 406 by the first core's prefetch engine controller whether all of the prefetch engines associated with the first core are busy. If not, then prefetch stream instruction processing is ended in step 420. Otherwise, the prefetch engine controller sets a Prefetch Stream Dispatch Fault bin in a Special Purpose Register (SPR) that is contained in the first core. Thereafter, a hypervisor recognizes the fault condition in step 410 and places a call to its associated operating system to process the fault condition. The operating system then examines the prefetch engine states of all cores that are available for use in the virtual machine environment. A determination is then made in step 414 whether a second core has an available prefetch engine. If not, then prefetch stream instruction processing is ended in step 420. Otherwise, the operating system migrates the thread in step 416 to the second core, which then initiates the thread in step 418. Prefetch stream instruction processing is then ended in step 420.

Although the present invention has been described in detail, it should be understood that various changes, substitutions and alterations can be made hereto without departing from the spirit and scope of the invention as defined by the appended claims.

What is claimed is:

1. A non-transitory computer-usable medium embodying computer program code, the computer program code comprising computer executable instructions configured for:
   polling registers in a plurality of processor cores to determine the availability of a corresponding plurality of prefetch engines;
   initiating a prefetch stream request on a first processor core comprising a first prefetch engine and a special purpose register (SPR);
   determining the first prefetch engine is unavailable to process the prefetch stream request;
   setting an indicator bit in the SPR to indicate a prefetch system dispatch fault;
   determining if a second prefetch engine in a second processor core is available to process the prefetch stream request; and
   migrating the prefetch stream request from the first processor core to the second processor core if the second prefetch engine is available.

2. The non-transitory computer usable medium of claim 1, wherein a hypervisor generates a call to an operating system when the indicator bit is set in the SPR.

3. The non-transitory computer usable medium of claim 2, wherein the operating system receives and processes the call to determine the availability of the second prefetch engine.

4. The non-transitory computer usable medium of claim 1, wherein a third core comprises a third prefetch engine that is available.

5. The non-transitory computer usable medium of claim 4, wherein the second core and the third core have an equal number of available prefetch engines and the third core is less utilized than the second core.

6. The non-transitory computer usable medium of claim 5, wherein the prefetch stream is migrated from the first core to the third core.

7. The non-transitory computer usable medium of claim 1, wherein the second core and the third core have an unequal number of available prefetch engines and the prefetch stream is migrated to the least utilized core.

8. The non-transitory computer usable medium of claim 1, wherein the second core and the third core have an unequal number of available prefetch engines and the prefetch stream is migrated to the core having the most available prefetch engines.

9. A system comprising:
   a processor;
   a data bus coupled to the processor; and
   a computer-usable medium embodying computer program code, the computer-usable medium being coupled to the data bus, the computer program code for managing prefetch streams in a virtual machine environment and comprising instructions executable by the processor and configured for:

polling registers in a plurality of processor cores to determine the availability of a corresponding plurality of prefetch engines;

initiating a prefetch stream request on a first processor core comprising a first prefetch engine and a special purpose register (SPR);

determining the first prefetch engine is unavailable to process the prefetch stream request;

setting an indicator bit in the SPR to indicate a prefetch system dispatch fault;

determining if a second prefetch engine in a second processor core is available to process the prefetch stream request; and migrating the prefetch stream request from the first processor core to the second processor core if the second prefetch engine is available.

10. The system of claim 9, wherein a hypervisor generates a call to an operating system when the indicator bit is set in the SPR.

11. The system of claim 10, wherein the operating system receives and processes the call to determine the availability of the second prefetch engine.

12. The system of claim 9, wherein a third core comprises a third prefetch engine that is available.

13. The system of claim 12, wherein the second core and the third core have an equal number of available prefetch engines and the third core is less utilized than the second core.

14. The system of claim 13, wherein the prefetch stream is migrated from the first core to the third core.

* * * * *